May 26, 1953 L. W. FALK 2,639,624
YIELDABLE POWER TRANSMISSION
Filed Aug. 19, 1949 2 Sheets-Sheet 1

INVENTOR.
Louis W. Falk
BY
Markes & French
Att'ys.

Patented May 26, 1953

2,639,624

UNITED STATES PATENT OFFICE 2,639,624

YIELDABLE POWER TRANSMISSION

Louis W. Falk, Milwaukee, Wis., assignor to The Falk Corporation, Milwaukee, Wis., a corporation of Wisconsin Application August 19, 1949, Serial No. 111,189

1 Claim. (Cl. 74—411)

The invention relates to power transmission mechanisms.

In some forms of power transmission mechanism, particularly those of the heavy duty type where large masses of material in the form of gears or other drive elements have to be set in motion and rotated at relatively high speeds, as for example in certain pump drives, the driving forces set up vibrations which may be serious if not damped or compensated for in some way. The object of the present invention is to provide a power transmission mechanism which will efficiently take care of the large driving forces involved by the use of dual couplings to reduce the natural frequency of the rotating system, take the system out of a critical period by making the connections more flexible, and make the entire drive softer or smoother running. By the present invention, the dual flexible couplings provide for a low critical speed, and their resilient action is symmetrically divided between the ends of the output shaft and the vibration absorption under normal working conditions, or even at a time the drive is passing through its critical during acceleration is efficiently taken care of.

A further object of the invention is to provide a means for protecting the teeth of a gear train against torsional vibrations by mechanism designed to reduce the natural vibration frequency of the low speed end of the gear train. Such means may be utilized to special advantage when applied to a speed-up gear train and particularly when the low speed end of the gear train is subjected to a fluctuating torque load of relatively low frequency.

The invention further consists in the several features hereinafter set forth and more particularly defined by the claim at the conclusion hereof.

Figure 1:
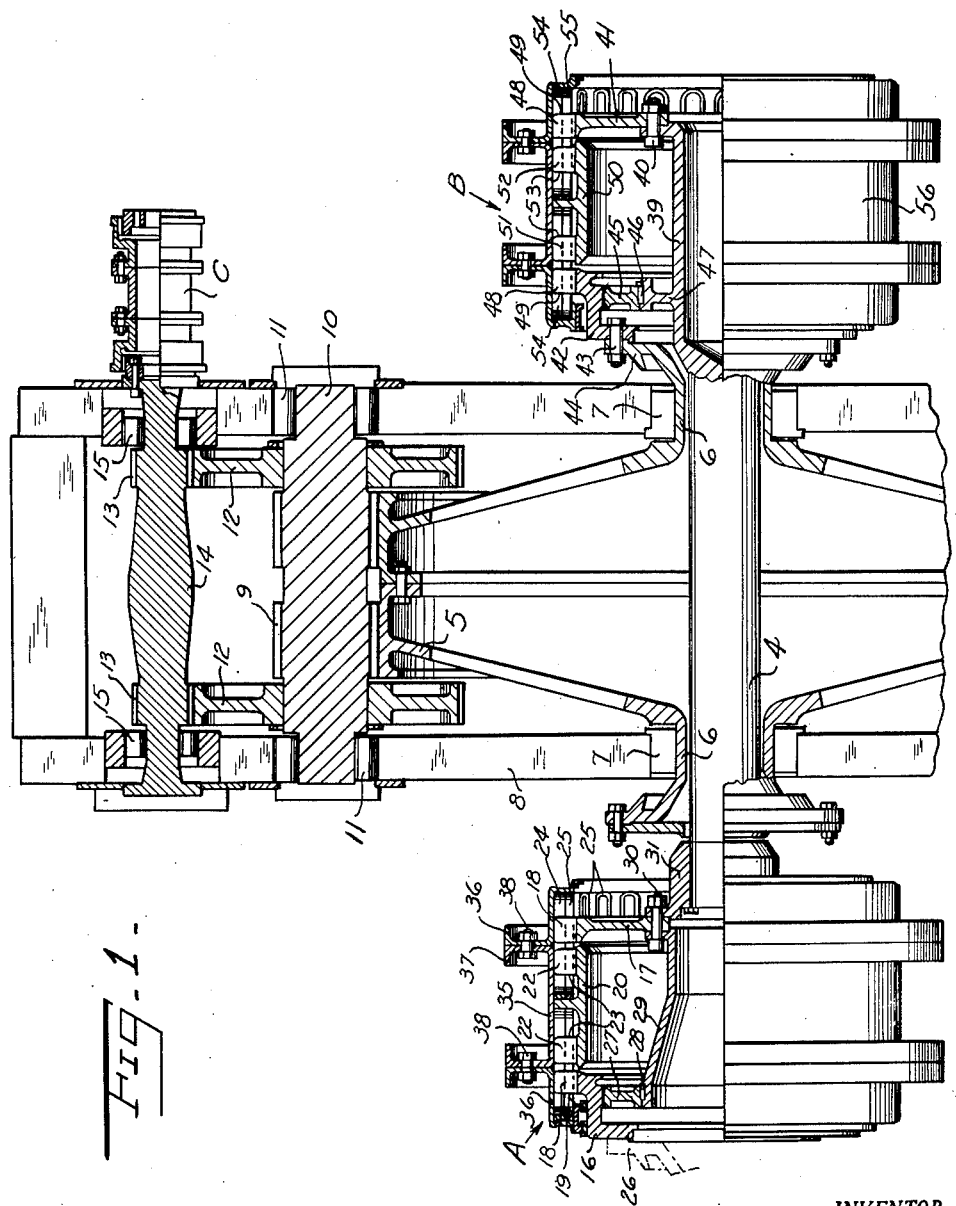
Fig. 1 is a vertical sectional view through a transmission mechanism embodying the invention.

Referring to the drawings, the numeral 4 designates a driven shaft or what will be termed a coupling shaft, 5 a gear or other rotary member to be driven, A a dual coupling connecting the shaft 4 with an engine or other drive member, and B a similar dual coupling connecting the shaft 4 with the gear 5.

As herein shown, the spaced hubs 6 of the gear 5 are each journalled in a bearing 7 mounted in a frame 8, said gear having its teeth meshing with gear teeth 9 on a shaft 10 journalled in bearings 11 in said frame and carrying gears 12 meshing with gears 13 formed integral with a shaft 14 journalled in bearings 15 in said frame and carrying a coupling C for connection with the machine part to be driven. The ratio of the gearing above described is such that the speed of the shaft 14 is considerably higher than that of the gear 5 and its coupling shaft 4.

Figure 2:
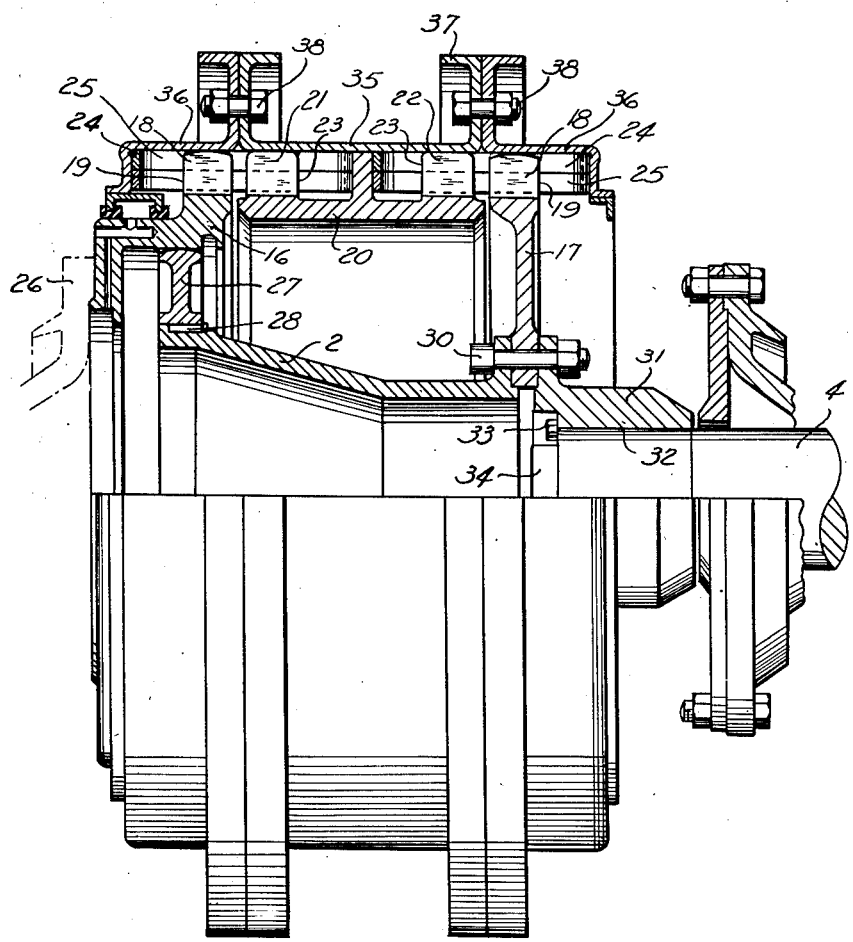
Fig. 2 is an elevation view of one of the dual couplings, parts being broken away and parts being shown in section.

Referring to Fig. 2, the dual coupling A comprises a drive coupling disk 16, a driven coupling disk 17 axially alined with the disk 16, each disk having an annular series of peripheral recesses or slots 18 separated by radial projections 19, an annular intervening coupling element 20 disposed between the disks 16 and 17 and having two similar annular series of peripheral recesses or slots 21 and 22 normally alined with the slots 18 of the adjacent or complementary disks 16 and 17, respectively, and being likewise separated by radial projections 23, an annular set of resilient torque transmitting members 24, 25 slidably and rockably snugly engaging each series of said element slots 21 and 22 and the adjacent normally alined slots 18. The two sets of resilient coupling connections above described are each generally similar to the single coupling shown and described in U. S. Patent No. 2,027,842, of January 14, 1936, to Walter P. Schmitter and Percy C. Day, to which reference may be made for a detailed showing of the slotted disks and their association with the torque transmitting members.

The disk 16 may be secured to a part 26, shown in dotted, forming part of an engine flywheel or a member secured thereto, and it forms a bearing support for the arcuate periphery of a ring 27 keyed at 28 to a hub 29 which with the disk 17 is secured by bolts 30 to a hub coupling 31 that has a tapered fit connection 32 with one end of the shaft 4, being secured in tight relation thereon by a nut 33 abutting the coupling 31 and having threaded connection with the threaded end 34 of said shaft.

The coupling element 20 is only connected to the disks 16 and 17 through torque members 24 and 25 and is disposed in a housing 35 surrounding the disks 16, 17 and carried thereby, said housing including flanged end rings 36 and a medial flanged ring 37 secured together by bolts 38.

Referring to Fig. 1, the dual coupling B is generally similar to the coupling A. The shaft 4 which extends through the hubs of the gear 5 has an enlarged hollow flanged end 39 which is secured by bolts 40 to a disk 41 which is like the disk 17. A disk 42, similar to the disk 16, is secured by bolts 43 to a flanged end 44 of the gear 5 and is also rockably engaged with the arcuate periphery of a ring 45 keyed at 46 to a flanged portion 47 of the end 39. Thus the shaft 4 has rocking engagement at one end through the ring 27 with the drive disk 16 and at its other end through the ring 45 with the driven disk 42. The disks 41 and 42 are substantially axially alined, and each disk has an annular series of peripheral recesses or slots 48 separated by radial projections 49. An annular intervening coupling element 50, similar to the element 20, is disposed between the disks 41 and 42 and has two similar annular series of peripheral recesses or slots 51 and 52 normally alined with the slots 48 of the adjacent or complementary disks 41 and 42, respectively, and being likewise separated by radial projections 53. An annular set of resilient torque transmitting members 54 and 55, slidably and rockably snugly engages each series of said element slots 51 and 52, and the adjacent normally alined slots 48, said slots being formed as shown more in detail in the aforementioned patent. A housing 56 similar to the housing 35 surrounds the disks 41 and 42 and the element 50 and is suitably mounted on one or both of the disks 41 and 42.

With the above construction the drive disk 16 transmits the torque through the resilient members 24 and 25 to one side of the medial element 20 which through the other set of resilient members 24 and 25 transmits the torque to the coupling shaft 4. The coupling shaft 4 through the disk 41 transmits the torque through the resilient members 54, 55 to one side of the medial element 50 which through the other set of resilient members 54 and 55 transmits the torque to the disk 42 coupled to the gear 5. Thus the drive passes through two sets of dual flexible couplings to the shaft or gear 5 to be driven and is very flexible which acts to lower the critical speed of the system with the consequent advantages heretofore pointed out. A transmission, as above described, is effective for transmitting the drive from a drive member connected with the crankshaft of a heavy duty relative slow speed engine to a pump driven at high speed through the gears 5, 9, 12, and 13.

It will be noted that the length of the coupling shaft 4 is just enough greater than the length of the hub of the gear 5 so as to provide for the coupling mountings on opposite ends of said shaft.

I desire it to be understood that this invention is not to be limited to any particular form or arrangement of parts except in so far as such limitations are included in the claim.

What I claim as my invention is:

In a gear drive transmission, the combination of a train of intermeshing gears including a relatively small high speed output pinion and a relatively large low speed input gear, a shaft extending through said low speed gear, a torsionally resilient torque transmitting coupling connected to one end of said shaft, and a torsionally resilient torque transmitting coupling connecting the other end of said shaft to said gear, said couplings coacting to reduce the natural torsional vibration frequency of the low speed end of said train to thereby protect the teeth of the intermeshing gears against the dangerous effects of torsional criticals.

LOUIS W. FALK.

References Cited in the file of this patent

UNITED STATES PATENTS

| Number | Name | Date |
|---|---|---|
| 1,324,523 | Serrell | Dec. 19, 1919 |
| 1,415,556 | Heisler | May 9, 1922 |
| 1,602,933 | Lyingstrom | Oct. 12, 1926 |
| 1,890,332 | Mueller-Keuth | Dec. 6, 1932 |
| 1,913,288 | Pierce | June 6, 1933 |
| 2,027,842 | Schmitter et al. | Jan. 14, 1936 |
| 2,148,564 | Kuhns | Feb. 28, 1939 |
| 2,247,839 | Halford et al. | July 1, 1941 |
| 2,441,446 | Schmitter | May 11, 1948 |